United States Patent

Christiansen

[15] 3,638,352
[45] Feb. 1, 1972

[54] SPLINED SHAFT AND WHEEL RETAINED THEREON BY SPRING AND HUB ELEMENT

[72] Inventor: Godtfred Kirk Christiansen, Billund, Denmark

[73] Assignee: Interlego A.G., Zug, Switzerland

[22] Filed: Jan. 29, 1970

[21] Appl. No.: 6,718

[30] Foreign Application Priority Data

Feb. 3, 1969 Denmark...............................573/69

[52] U.S. Cl....................................46/23, 46/31, 46/221, 287/52.05, 301/112
[51] Int. Cl..........................................................A63h 33/10
[58] Field of Search....................46/16, 17, 23, 31, 206, 221; 301/1, 112; 287/52.05

[56] References Cited

UNITED STATES PATENTS

| | | | |
|---|---|---|---|
| 3,566,536 | 3/1971 | Baynes et al............................ | 46/221 |
| 3,553,882 | 1/1971 | Meates.................................... | 46/23 X |
| 2,539,387 | 1/1951 | Alden..................................... | 301/112 |
| 3,396,554 | 8/1968 | Westercamp................... | 287/52.05 X |
| 806,872 | 12/1905 | Clark ....................................... | 301/1 UX |
| 2,186,188 | 1/1940 | Allen....................................... | 46/17 |
| 3,236,004 | 2/1966 | Christiansen............................ | 46/23 |

FOREIGN PATENTS OR APPLICATIONS 649,440   1/1951   Great Britain......................287/52.05

*Primary Examiner*—F. Barry Shay
*Attorney*—Stevens, Davis, Miller & Mosher

[57] ABSTRACT

A construction toy including a splined shaft and a wheel element nonrotatably fitting thereon and retained by a spring ring which grips the shaft. A hub element is detachably secured to the wheel, with the spring occupying a recess between wheel and hub elements to limit their movement on the shaft.

A) THE PROBLEM

Small children playing with mechanical toy building sets often have difficulties in securing pinions, pulleys, discs and similar wheel elements on shafts when building vehicles or other mechanical devices. Fastening such wheel elements on the shafts generally requires the use of tools or accessories which are difficult to handle for small children.

B) THE SOLUTION

Two essential features are required for solving this problem, and the invention consists in the combination of these features:

a. To provide a shaft having a noncircular cross section and wheel elements having a complementary hole, so as to enable the child to mount the wheels on the shaft by pushing them thereon from one end, thereby fixing the wheels on the shaft so as to prevent relative rotational movement.

b. To provide a frictional fit between the shaft and the wheels so that axial displacement can only be effected by overcoming the friction therebetween. To this end a cylindrical recess is provided in the wheel element surrounding the central hole therein and an annular spring is located in the cylindrical recess in such a manner as to exert a radial pressure against the shaft, thereby increasing the frictional resistance against axial displacement of the wheels relatively to the shaft. The functioning of this spring is automatic and requires no skill or attention on the part of the user.

c. The shaft may be tapered at one end, so as to facilitate the mounting of the wheels.

d. The width of the cylindrical recess or cavity within the wheel is greater than the thickness of the spring to prevent the spring from being jammed within the cylindrical recess.

e. The cylindrical cavity or recess is closed so as to totally enclose the annular spring by means of a hub element assembled with the side of the wheel.

1 Claims, 3 Drawing Figures

Fig. 3

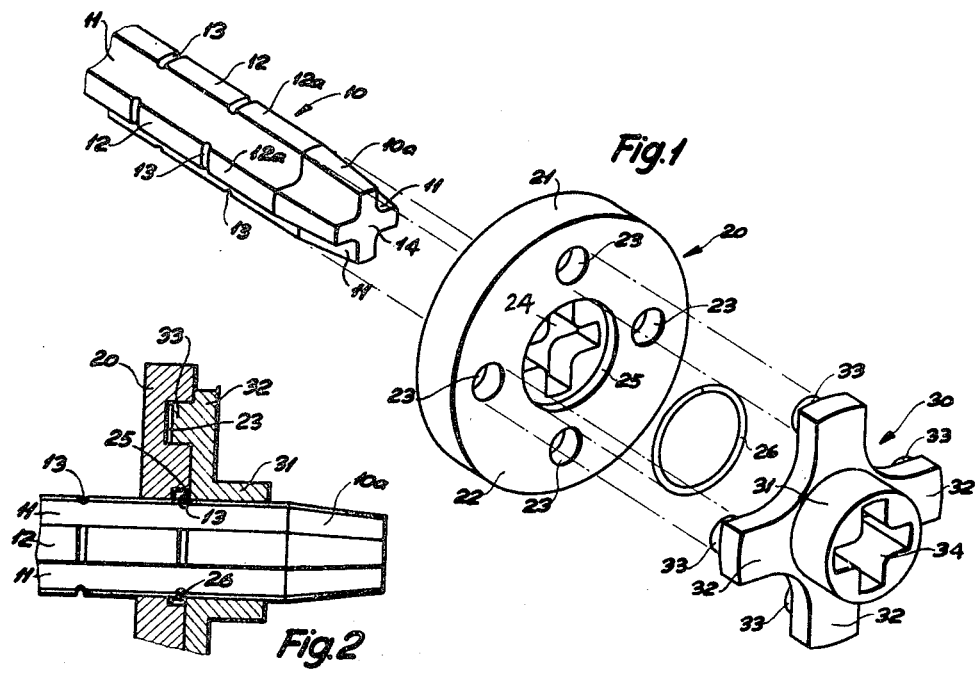
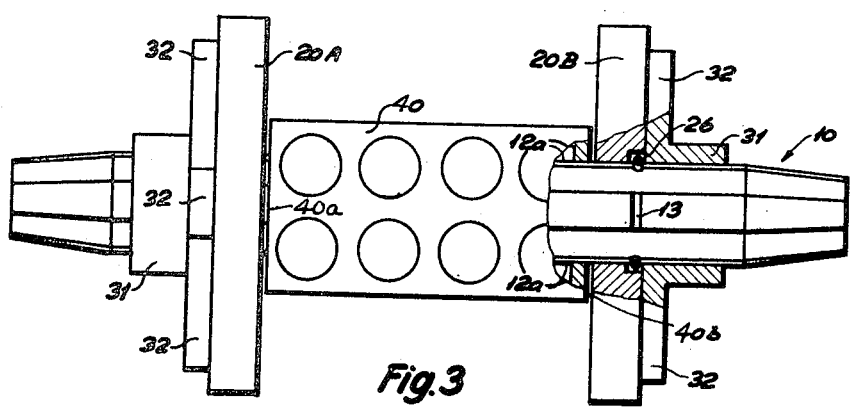

SPLINED SHAFT AND WHEEL RETAINED THEREON BY SPRING AND HUB ELEMENT

This invention relates to mechanical toy building sets comprising elements preferably made of molded thermoplastic material and including bearing elements, shaft elements adapted to be rotatably mounted therein and wheel elements adapted to be mounted on the shaft elements for rotation therewith. More particularly, the invention relates to a wheel and shaft assembly for such building sets including fastening means for mounting the wheel elements on the shafts in any desired position so as to exclude any rotational movement relatively thereto but permitting an axial displacement against the frictional fit between the wheel and the shaft. It should be noted that, in this context, the works "wheel element" refer to any element of circular or disclike shape such as running or driving wheels, pinions, pulleys and similar elements adapted to be mounted on shafts for building vehicles, gears, power transmission systems or the like.

The principal object of the invention is to provide simple, efficient and inexpensive fastening means which will enable even quite small children to fix the wheel elements safely and securely on the shaft elements without any requirements for skill and accuracy and without any use of tools or accessories. It has been found through many years of practical experience that the fulfillment of these conditions is of decisive importance to the utility and success of such toy building sets: the basic requirement is that the toy must be "childproof," and it should be observed that this is by no means achieved by simply copying real machine elements on a reduced scale. In fact, in many cases a thorough study of child psychology and behavior is required for the construction of toy elements which are completely childproof.

In the case of the present invention, the object of providing a childproof wheel and shaft assembly has been achieved by the combination of features set forth in the claims and explained in details with reference to the embodiment illustrated in the drawings, wherein:

FIG. 1 is an exploded perspective view showing the components of the wheel and shaft assembly according to the invention, FIG. 2 is an axial sectional view showing the wheel element mounted on the shaft and operatively associated therewith, FIG. 3 is a view similar to FIG. 2 showing a pair of wheel elements mounted on the shaft at either side of a bearing element in which the shaft is rotatably mounted.

Referring to the drawings and more particularly to FIG. 1 thereof, it will be seen that the components of the wheel and shaft assembly comprise the following main elements:
- a shaft element, generally designated as 10
- a wheel element, generally designated as 20
- a hub element, generally designated as 30
- an annular spring 26.

The shaft 10 is provided with four lengthwise extending grooves 11 forming between them four ridges or beads 12 so as to provide for a cross-shaped cross section 14 of the shaft. One end of the shaft 10 is slightly tapered as shown at 10a in FIG. 1 so as to facilitate the mounting of the wheel element 20 by pushing it on to the shaft from one end thereof. The external surface 12a of the ribs or ridges 12 are of cylindrical shape constituting fractions of a cylindrical surface interrupted by the grooves 11 and providing for rotational mounting of the shaft within a bearing element as shown in FIG. 3. Finally, the ribs or ridges 12 may be provided with a plurality of grooves 13 extending in the transverse direction of the shaft. The function of these grooves 13 will be explained in the following.

The wheel element 20 shown in FIG. 1 comprises a cylindrical surface 21 which may be provided with teeth (not shown) if the wheel element is a pinion or with a groove if the wheel element is a pulley. For the sake of simplicity, the wheel element is shown as a disc having a plain cylindrical face 21 and annular side face 22 comprising four holes 23 and a central hole 24 of substantially the same configuration as the cross section 14 of the shaft 10. Finally, the wheel element comprises a cylindrical recess or cavity 25 in the side face 22 and surrounding and coaxial with the hole 24, said recess being adapted to receive the annular spring 26 and to form an enclosed annular groove in the wheel element 20 when the latter is assembled with the hub element 30.

The hub element 30 comprises a cylindrical center portion 31 having a central hole 34 of identically the same shape as the hole 24 in the wheel element 20 and a cross-shaped disc portion having four branches 32 each carrying a stud 33 projecting from the back face thereof and adapted to be inserted into the four holes 23 of the wheel element 20 so as to provide coupling means for interconnecting the wheel 20 and the hub 30 when the annular spring 26 has been inserted in its groove 25. The depth of this groove, i.e., its extension in the axial direction of the assembly should be slightly larger than the thickness of the annular spring 26 so as to allow for a slight axial displacement of the wheel element relatively to the spring when the latter is clamped around the shaft within the groove 25. In fact, it will be appreciated that, if the spring 26 could be clamped or pinched between the hub and wheel elements, its spring function would be eliminated and it could no longer function as a stop preventing or hampering axial displacement of the wheel on the shaft. On the other hand this function may be increased by provision of the grooves 13 for receiving the spring 26 as shown in FIG. 2.

FIG. 3 shows a pair of wheel elements 20A and 20B mounted adjacent a bearing element 40 at either side 40a and 40b thereof. The shaft 10 carrying the wheels 20A and 20B is rotatably mounted within the bearing 40 by means of the cylindrical portions 12a of the ribs 12, the diameter of which substantially corresponds to the internal diameter of the bearing.

The purpose of FIG. 3 is to show how the particular arrangement according to the invention tends to make the assembly completely childproof.

By using any of the previously known fastening means for fixing the wheels 20A and 20B adjacent the bearing 40, the child might very well risk that the wheels would be fixed so close to the bearing as to be clamped against its surface thus preventing rotation of the shaft. Such fastening means, therefore, are not childproof.

On the other hand, when using the assembly according to this invention, the child may simply push the wheel elements 20A and 20B along the shaft until their side faces touch the sides of the bearing 40. The slight play of the wheel element relatively to the spring element 26 grasping the shaft will always allow for sufficient axial displacement to prevent any blocking of the wheels against the sides of the bearing.

I claim:
1. In a toy building set, a wheel and shaft assembly comprising the combination of the following components made by injection molding of a thermoplastic material:
   a. A splined shaft element having a plurality of axially extending grooves forming ribs therebetween, said ribs having cylindrical outer surfaces coaxially disposed with respect to the shaft;
   b. An internally splined wheel element fitting the shaft element, so as to be slidably, but nonrotatably secured thereto, said wheel element comprising a disc-shaped member having at least one plane side face, a central bore in said plane side face defining a cylindrical recess in said disc-shaped member;
   c. An annular spring fitting into said cylindrical recess, the width of said annular spring being less than the depth of said cylindrical recess; and
   d. An internally splined hub element fitting the shaft element so as to be slidably, but nonrotatably mounted thereon adjacent the cylindrical recess in the disc-member, thereby defining a closed cylindrical cavity in said disc enclosing the said annular spring, said disc and hub elements being provided with means for mutually interlocking them, said spring being of a size such that, when said wheel element, spring and hub element are mounted on said shaft element, said spring exerts a radial pressure on said shaft element while preventing said wheel element and hub element from sliding past said spring.

* * * * *